(12) United States Patent
Chou

(10) Patent No.: US 9,645,368 B2
(45) Date of Patent: May 9, 2017

(54) ZOOM LENS

(75) Inventor: Hsiang-Ho Chou, Taipei (TW)

(73) Assignee: ABILITY ENTERPRISE CO., LTD., Taipei (TW)

(*) Notice: Subject to any disclaimer, the term of this patent is extended or adjusted under 35 U.S.C. 154(b) by 113 days.

(21) Appl. No.: 13/347,470

(22) Filed: Jan. 10, 2012

(65) Prior Publication Data

US 2012/0268833 A1    Oct. 25, 2012

(30) Foreign Application Priority Data

Apr. 19, 2011 (TW) .............................. 100113555 A

(51) Int. Cl.
| G02B 15/14 | (2006.01) |
| G02B 15/173 | (2006.01) |
| G02B 5/04 | (2006.01) |

(52) U.S. Cl.
CPC .............. *G02B 15/173* (2013.01); *G02B 5/04* (2013.01)

(58) Field of Classification Search
USPC ........................................ 359/686, 687, 715
See application file for complete search history.

(56) References Cited

U.S. PATENT DOCUMENTS

| 6,433,938 | B1 | 8/2002 | Kawamura | |
| 7,315,423 | B2 | 1/2008 | Sato | |
| 7,375,901 | B2 | 5/2008 | Tanaka | |
| 7,446,947 | B2* | 11/2008 | Yamamoto | G02B 15/173 359/676 |
| 7,468,845 | B2 | 12/2008 | Chuang et al. | |
| 7,489,450 | B2* | 2/2009 | Matsumoto | G02B 7/102 359/687 |
| 7,630,138 | B2* | 12/2009 | Ori | G02B 15/173 348/240.3 |
| 7,791,818 | B2* | 9/2010 | Lee | 359/687 |
| 8,218,246 | B2* | 7/2012 | Hagiwara | 359/687 |
| 8,488,252 | B2* | 7/2013 | Yoshitsugu | 359/686 |
| 2006/0215277 | A1 | 9/2006 | Sato | |
| 2007/0002460 | A1* | 1/2007 | Yamamoto | G02B 15/173 359/687 |
| 2007/0195425 | A1* | 8/2007 | Arai | G02B 27/646 359/687 |
| 2011/0242677 | A1* | 10/2011 | Lin | G02B 15/173 359/687 |

FOREIGN PATENT DOCUMENTS

| CN | 1837887 A | 9/2006 |
| CN | 101025470 A | 8/2007 |
| CN | 101042463 A | 9/2007 |
| CN | 201397418 Y | 2/2010 |
| CN | 102736228 A | 10/2012 |
| EP | 1837692 A1 | 9/2007 |
| JP | 08-160300 A | 6/1996 |

OTHER PUBLICATIONS

Chinese Office Action dated on Sep. 22, 2014.

* cited by examiner

*Primary Examiner* — Jack Dinh
(74) *Attorney, Agent, or Firm* — Rabin & Berdo, P.C.

(57) ABSTRACT

An embodiment of this invention provides a zoom lens that includes, in order from an object side to an image-forming side, a first lens group having positive refraction power; a second lens group having negative refraction power; a third lens group having positive refraction power; and a fourth lens group having positive refraction power; wherein the second lens group and the fourth lens group move along an optical axis for zooming between a wide-angle end and a telephoto end.

21 Claims, 5 Drawing Sheets

ZOOM LENS

CROSS-REFERENCE TO RELATED APPLICATIONS

The entire contents of Taiwan Patent Application No. 100113555, filed on Apr. 19, 2011, from which this application claims priority, are incorporated herein by reference.

BACKGROUND OF THE INVENTION

1. Field of the Invention

The present invention relates to zoom lenses, especially to zoom lenses with low cost, high zoom ratio, compact size, and good image quality.

2. Description of Related Art

Image-capturing devices, such as digital cameras or digital camcorders, employ a zoom lens and an image sensor to collect an image beam of an object, in which the zoom lens focuses the image beam on the image sensor, which then turns analog signals of the image beam into digital signals for following processing, transmitting, and storage.

Typically, the zoom lens of the image-capturing devices consists of several lenses. To offer competitive prices, one or more plastic lenses are employed in the zoom lens; however, the plastic lenses come with the disadvantages of moisture and light absorption, and conflict may appear between compact size, high zoom ratio, and good image quality when reducing the cost.

Therefore, it would be advantageous to provide a novel zoom lens having advantages of compact size, high zoom ratio, and good image quality when reducing the cost.

SUMMARY OF THE INVENTION

An object of the present invention is to provide novel zoom lenses having advantages of compact size, high zoom ratio, and good image quality.

Accordingly, one embodiment of this invention provides a zoom lens that primarily comprises, in order from an object side to an image-forming side, a first lens group having positive refractive power, a second lens group having negative refractive power, a third lens group having positive refractive power, and a fourth lens group having positive refractive power, wherein the second lens group and the fourth lens group are moved along an optical axial for zooming between a wide-angle end and a telephoto end.

By the features described above, the zoom lens of this invention has more compact size, lower cost, and better image quality than conventional ones.

DESCRIPTION OF THE PREFERRED EMBODIMENT

Reference will now be made in detail to specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known components and process operations have not been described in detail in order not to unnecessarily obscure the present invention. While drawings are illustrated in detail, it is appreciated that the quantity of the disclosed components may be greater or less than that disclosed, except where expressly restricting the amount of the components.

Figure 1A:
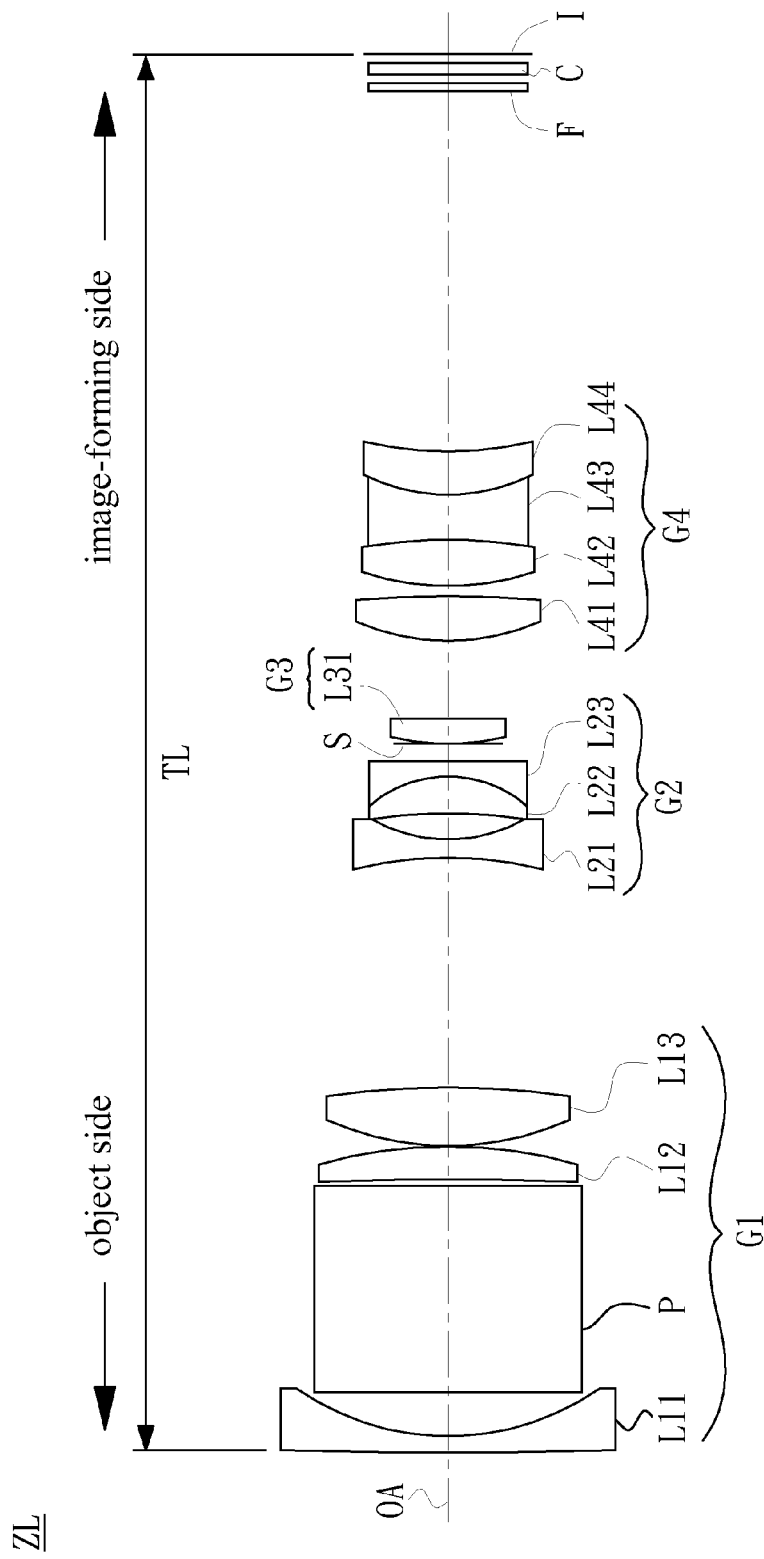
FIG. 1A and FIG. 1B respectively show a zoom lens at the telephoto end and the wide-angle end, according to a preferred embodiment of this invention.
Figure 1B:
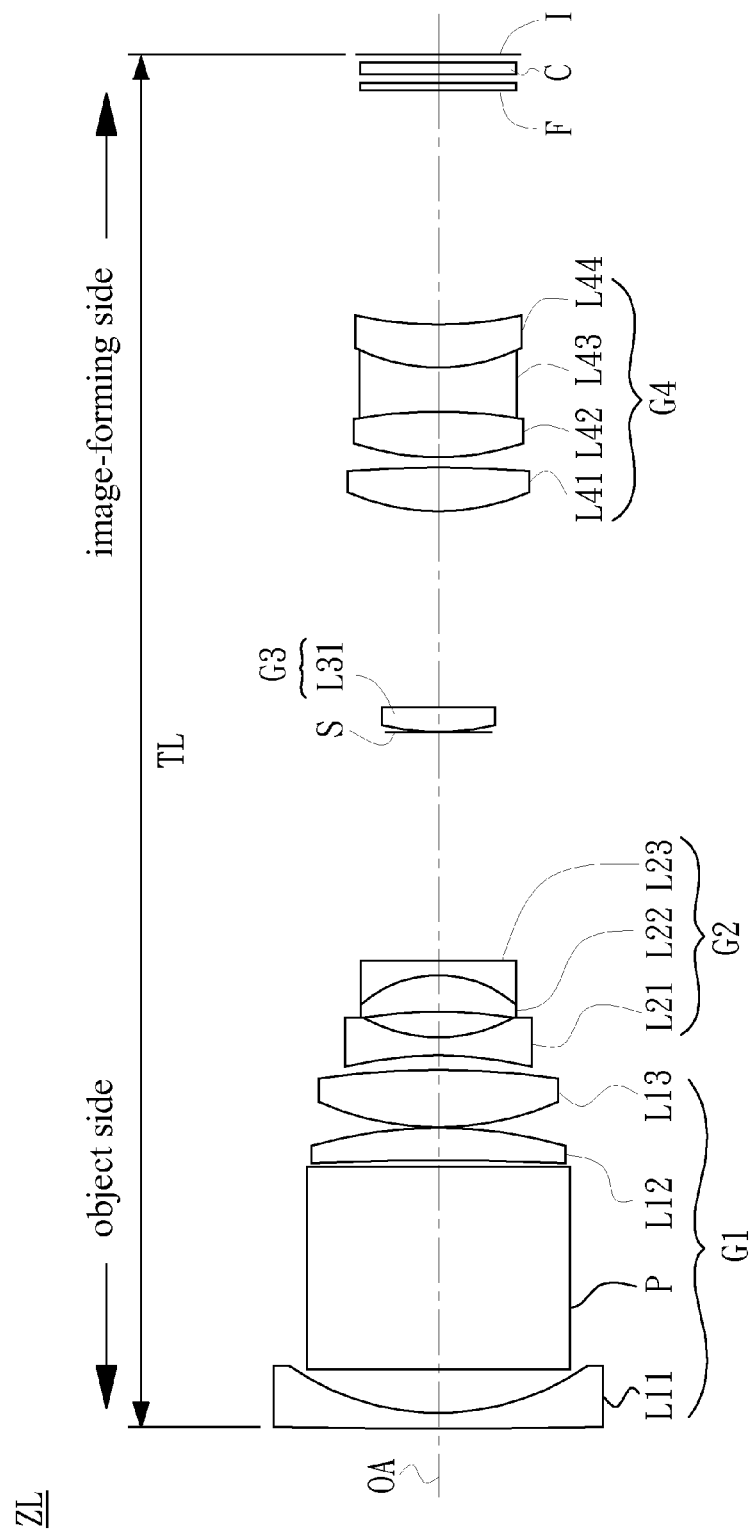

FIG. 1A and FIG. 1B show a zoom lens ZL according to a preferred embodiment of this invention, wherein FIG. 1A shows the position of every lens in the telephoto end and FIG. 1B shows the position of every lens in the wide-angle end. To highlight features of the zoom lens ZL, the drawings merely show related components of this embodiment and omit other irrelevant or minor components. The zoom lens illustrated by this embodiment may be employed in an electronic device capable of capturing images, such as a digital camera, a digital camcorder, a cellular phone, a projector, and the like.

As shown in FIG. 1A and FIG. 1B, the zoom lens ZL primarily consists of, in order from an object side to an image-forming side, a first lens group G1, a second lens group G2, a third lens group G3, and a fourth lens group G4. These four lens groups are arranged along an optical axis OA, and an image-forming surface I is arranged at the image-forming side. The first lens group G1 has positive refractive power, the second lens group G2 has negative refractive power, the third lens group G3 has positive refractive power, and the fourth lens group G4 has positive refractive power.

For needs of compact size, low cost, high zoom ratio, and good image quality, the zoom lens ZL satisfies the following conditions:

$$4.0 < ft/fw < 6.0; \text{ and} \tag{1}$$

$$2.0 < |fG1/fG2| < 4.0, \tag{2}$$

wherein fG1 denotes the focal length of the first lens group G1, fG2 denotes the focal length of the second lens group G2, fw denotes the focal length of the zoom lens ZL at the wide-angle end, and ft denotes the focal length of the zoom lens ZL at the telephoto end.

As shown in FIG. 1A and FIG. 1B, the zoom lens ZL may further comprise a stop S and a filter F. The stop S may be arranged between the second lens group G2 and the third lens group G3, for limiting the light flux of the image beam into the third lens group G3. The filter F may be arranged between the fourth lens group G4 and the image-forming surface I, for filtering invisible light off the image beam. The filter F may be an infrared light filter. The image-forming surface denotes an image-capturing unit having light-to-electricity conversion function, for receiving image beam passing through the filter F. In addition, a flat lens C, as a cover glass, may be arranged between the image-forming surface I and the filter F.

In this embodiment, when the zoom ratio and the focal length of the zoom lens ZL are needed to be adjusted, the positions of the first lens group G1 and the third lens group G3 will be kept, and the second lens group G2 and the fourth lens group G4 are moved along the optical axis OA, so as to determine a zoom ratio. In detail, when zooming from the telephoto end to the wide-angle end, the second lens group G2 and the fourth lens group G4 are moved away from the third lens group G3.

Referring to FIG. 1A and FIG. 1B again, the zoom lens ZL comprises at least four aspheric lenses or free-form lenses. In detail, each of the four lens groups comprises an aspheric lens or a free-form lens made of plastic or glass. The plastic may comprise, but is not limited to, polycarbonate, cyclic olefin copolymer (e.g. APEL), polyester resins (e.g. OKP4 or OKP4HT), and the like. In addition, each free-form lens comprises at least one free-form freedom surface, and each aspheric lens comprises at least one aspheric surface satisfying the following equation (3):

$$Z = \frac{CY^2}{1+\sqrt{1-(K+1)C^2Y^2}} + A_4Y^4 + A_6Y^6 + A_8Y^8 + A_{10}Y^{10} + A_{12}Y^{12},$$

where Z is the coordinate in the optical axis OA direction in which direction light propagates as positive, $A_4, A_6, A_8, A_{10}$, and $A_{12}$ are aspheric coefficients, K is coefficient of quadratic surface, R is the radius of curvature, C is reciprocal of R (C=1/R), Y is the coordinate in a direction perpendicular to the optical axis in which the upward direction is positive, and coefficients of equation (3) of each aspheric lens are predetermined to determine the focal length and thus satisfy the above-mentioned conditions.

In this preferred embodiment, the first lens group G1 comprises, in order from the object side to the image-forming side, a first lens L11, a second lens L12, a third lens L13, in which the first lens L11 is a negative convex-concave lens having a convex toward the object side, the second lens L12 is a positive convex-concave lens having a convex toward the image-forming side, and the third lens L13 is a positive biconvex lens. The second lens group G2 comprises, in order from the object side to the image-forming side, a first lens L21, a second lens L22, a third lens L23, in which the first lens L21 is a negative biconcave lens, the second lens L22 is a negative convex-concave lens having a convex toward the image-forming side, and the third lens L23 is a positive convex-concave lens having a convex toward the image-forming side. The third lens group G3 comprises a first lens L31, which is a positive biconvex lens. The fourth lens group G4 comprises, in order from the object side to the image-forming side, a first lens L41, a second lens L42, a third lens L43, and a fourth lens L44, in which the first lens L41 is a positive biconvex lens, the second lens L42 is a positive biconvex lens, the third lens L43 is a negative biconcave lens, and the fourth lens L44 is a negative convex-concave lens having a convex surface toward the object side.

In addition, the zoom lens ZL may further comprise a reflector for deflecting the direction of the image beam, e.g. deflecting the direction of the image beam by 90°. In this preferred embodiment, the reflector is a prism P, arranged between the first lens L11 and the second lens L12 of the first lens group G1, for deflecting the optical path of the image beam and shortening the total length of the zoom lens ZL. The prism P may be arranged in other positions in other embodiments of this invention. In addition, the reflector may be a mirror or other components known in the art.

Furthermore, in this preferred embodiment, the zoom lens ZL further satisfies the following condition:

$$1.5 < PL/fw < 2.2, \quad (3)$$

wherein PL denotes the optical path length of the prism P for deflecting the image beam, i.e. the optical path of the image beam within the prism P. In another embodiment, condition (3) may be modified as $1.75 < PL/fw < 2.0$.

Notice that other embodiments of this invention may omit the reflector. In practical, the third lens L13 of the first lens group G1, the first lens L21 of the second group G2, the first lens L31 of the third lens group G3, and the fourth lens L44 of the fourth lens group G4 are aspheric lenses with two aspheric surfaces or free-form lenses with two free-form freedom surfaces, and other lenses of the zoom lens are spherical glass lenses with two spherical surfaces. In this preferred embodiment, the third lens L13 and the first lens L31 are glass lenses, and the first lens L21 and the fourth lens L44 are plastic lenses. Notice that the free-form lens may replace the aspheric lens. In addition, the second lens L22 and the third lens L23 of the second lens group G2, and the second lens L42 and the third lens L43 of the fourth lens group G4, may be glued to be a doublet lens.

A polish or a glass molding process (GMP), using an optical grade glass material, may be used to fabricate the glass lenses, and an injection molding process, using a polymer as the material, may be used to fabricate the plastic lenses.

Table 1 lists the detail information of the zoom lens ZL shown in FIG. 1A, according to an example of this invention. The information includes the curvature radius, the thickness, the refractive index, and the Abbe number of lenses or every surface of lenses in the zoom lens, where the surface numbers are sequentially ordered from the object side to the image-forming side. For example, "S1" stands for the surface of the first lens L11 facing the object side, "S2" stands for the surface of the first lens L12 facing the image-forming side, "S3" stands for the surface of the prism P facing the object side, "S" stands for the stop, "S25" and "S26" respectively stands for the surface of the filter F facing the object side and the image-forming side, "S27" and "S28" respectively stands for the surface of the flat lens C facing the object side and the image-forming side, and so on.

TABLE 1

| lens No. | Surface No. | curvature radius (mm) | thickness (mm) | refractive index | Abbe no. |
|---|---|---|---|---|---|
| L11 | S1 | 186.0803 | 0.75 | 1.9037 | 31.32 |
|  | S2 | 12.1990 | 2 |  |  |
| P | S3 | ∞ | 9.1 | 1.8467 | 23.78 |
|  | S4 | ∞ | 0.28 |  |  |
| L12 | S5 | −120.958 | 1.51 | 1.6516 | 58.55 |
|  | S6 | −20.0431 | 0.1 |  |  |
| L13 | S7 | 14.385 | 2.55 | 1.5533 | 71.68 |
|  | S8 | −26.59 | D1 |  |  |
| L21 | S9 | −12.831 | 0.8 | 1.544 | 56.11 |
|  | S10 | 8.074 | 1.127 |  |  |
| L22 | S11 | −19.6712 | 1.68 | 1.8467 | 23.78 |
|  | S12 | −5.006 | 0 |  |  |
| L23 | S13 | −5.006 | 0.65 | 1.8823 | 40.76 |
|  | S14 | −132.871 | D2 |  |  |
|  | S | ∞ | 0.1 |  |  |
| L31 | S15 | 11.953 | 1.07 | 1.4981 | 81.56 |
|  | S16 | −150 | D3 |  |  |

TABLE 1-continued

| lens No. | Surface No. | curvature radius (mm) | thickness (mm) | refractive index | Abbe no. |
|---|---|---|---|---|---|
| L41 | S17 | 9.878 | 2 | 1.4970 | 81.61 |
|  | S18 | −47.17 | 0.397 |  |  |
| L42 | S19 | 11.224 | 2 | 1.4970 | 81.61 |
|  | S20 | −32.236 | 0 |  |  |
| L43 | S21 | −32.236 | 2 | 1.8061 | 33.27 |
|  | S22 | 7.522 | 0.1 |  |  |
| L44 | S23 | 7.533 | 2 | 1.544 | 56.11 |
|  | S24 | 32.1223 | D4 |  |  |
| F | S25 | ∞ | 0.3 | 1.5163 | 61.142 |
|  | S26 | ∞ | 0.4 |  |  |
| C | S27 | ∞ | 0.5 | 1.5163 | 61.142 |
|  | S28 | ∞ | 0.8 |  |  |
|  | I | ∞ | 0 |  |  |

In Table 1, the "thickness" stands for the distance between the indicated surface and the next. For example, the thickness of the surface S1 is the distance between the surface S1 and the surface S2, and the thickness of the surface S2 is the distance between the surface S2 and the surface S3. In addition, the thickness labeled with D1, D2, D3, or D4 indicates that the thickness is a variable depending on the wide-angle end or the telephoto end, and Table 2 lists the detail.

TABLE 2

| thickness | Wide-angle end (mm) | Telephoto end (mm) |
|---|---|---|
| D1 | 0.80 | 10.18 |
| D2 | 10.06 | 0.680 |
| D3 | 10.26 | 3.366 |
| D4 | 8.75 | 15.651 |

Besides, Table 3 lists the focal length f, the aperture F number (FNO), the half angle view ω, the image height Y, and the total length TL of the zoom lens in this example.

TABLE 3

| Parameters | Wide-angle end | Telephoto end |
|---|---|---|
| F (mm) | 5 | 24 |
| FNO | 3.6 | 5.02 |
| ω (°) | 40.2245 | 9.38343 |
| Y (mm) | 3.6 | 4 |
| TL (mm) | 62.084 | 62.091 |

Furthermore, in this example, the third lens L13, the first lens L21, the first lens L31, and the fourth lens L44 are aspheric lenses, and the surfaces S7, S8, S9, S10, S17, S18, S25, and S26 are aspheric surfaces. The aspheric coefficients of the aspheric surfaces are listed in Table 4.

TABLE 4

|  | K | $A_4$ | $A_6$ | $A_8$ | $A_{10}$ | $A_{12}$ |
|---|---|---|---|---|---|---|
| S7 | 0 | −4.1E−05 | 1.88E−07 | −1.5E−08 | 1.38E−10 | 0 |
| S8 | 0 | −2E−05 | 2.72E−07 | −1.2E−08 | 1.37E−10 | 0 |
| S9 | 0 | 0.001078 | −8.4E−05 | 5.37E−06 | −1.8E−07 | 2.23E−09 |
| S10 | 0 | 0.000601 | −3.9E−05 | −3.6E−06 | 7.21E−07 | −3.1E−08 |
| S17 | 0 | −0.00055 | 8.99E−07 | −7.1E−07 | −2E−07 | 0 |
| S18 | 0 | −0.0004 | −3.9E−06 | −2.8E−07 | −2E−07 | 0 |
| S25 | 0 | −0.00019 | 2.5E−05 | −2.3E−06 | 3.81E−08 | 0 |
| S26 | 0 | 0.000522 | 3.14E−05 | −1.9E−06 | 1.77E−08 | 0 |

Figures 2A, 2B:
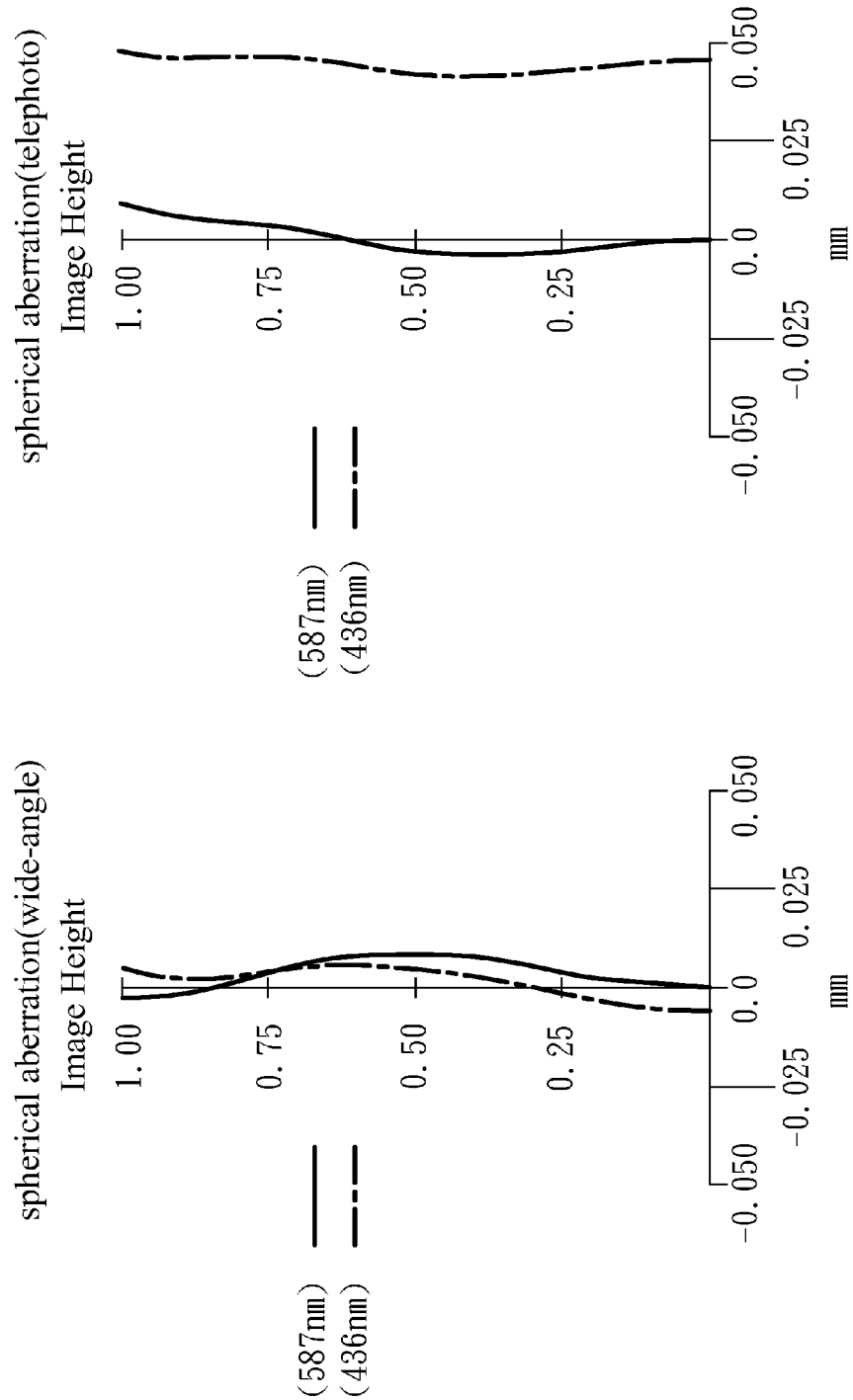
FIGS. 2A and 2B respectively show the longitudinal spherical aberration chart of the zoom lens at the wide-angle end and the telephoto end, according to an example of this invention.

FIGS. 2A and 2B respectively show the longitudinal spherical aberration chart of the zoom lens at the wide-angle end and the telephoto end, according to an embodiment of this invention. The charts show that for image beams with wavelength 436 and 587 nm, the spherical aberrations are all within ±0.0175 mm at the wide-angle end, and less than 0.050 mm and ±0.0125 mm at the telephoto end, respectively.

Figures 3A, 3B:
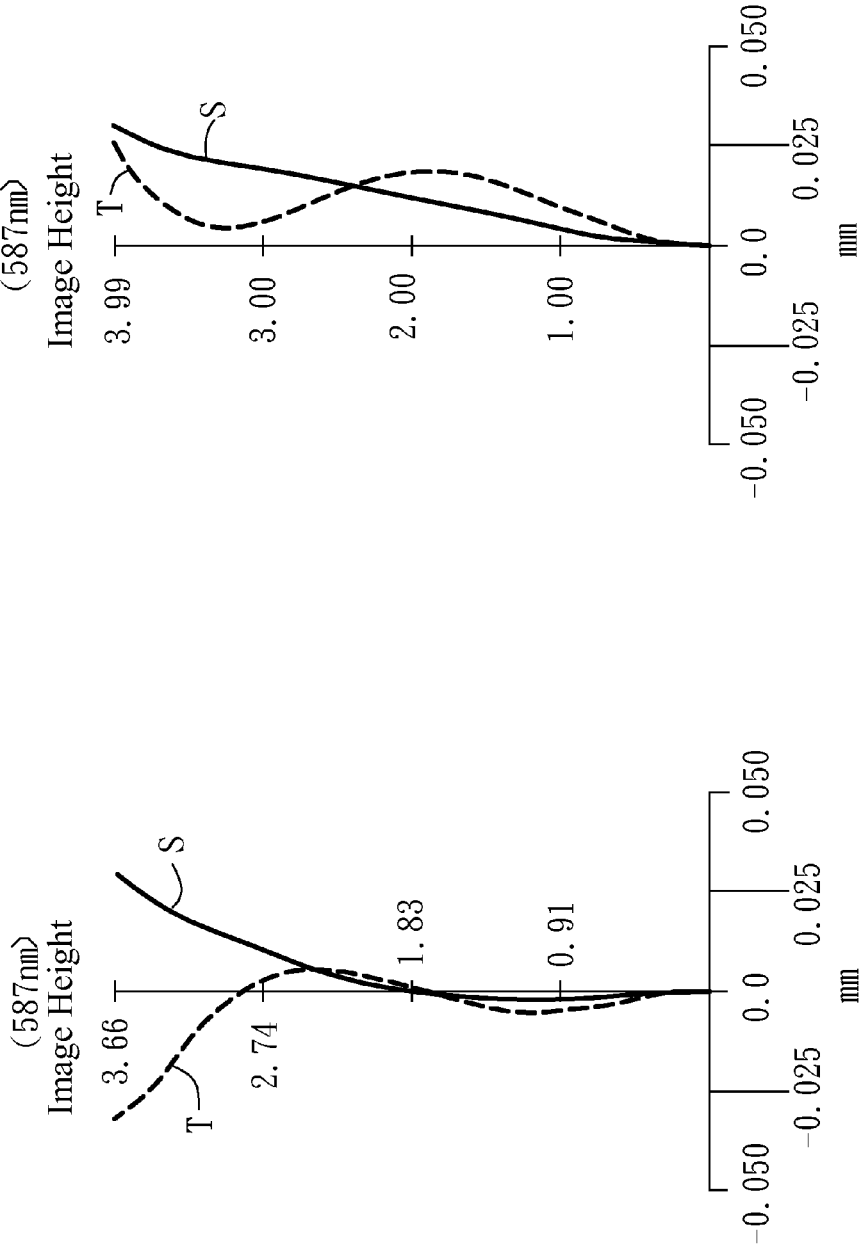
FIGS. 3A and 3B respectively show the astigmatism chart of the zoom lens at the wide-angle end and the telephoto end, according to an example of this invention.

FIGS. 3A and 3B respectively show the astigmatism chart of the zoom lens at the wide-angle end and the telephoto end, according to an example of this invention. Where curve T and S stand for the aberration of the zoom lens to the tangential rays and the sagittal rays for an image beam with wavelength 587 nm; in the wide angle end, S (i.e. tangential value) and T (i.e. sagittal value) are both set in the range of (−0.05 mm, 0.05 mm); in the telephoto end, S and T are both set in the range of (0.00 mm, 0.04 mm).

Figures 4A, 4B:
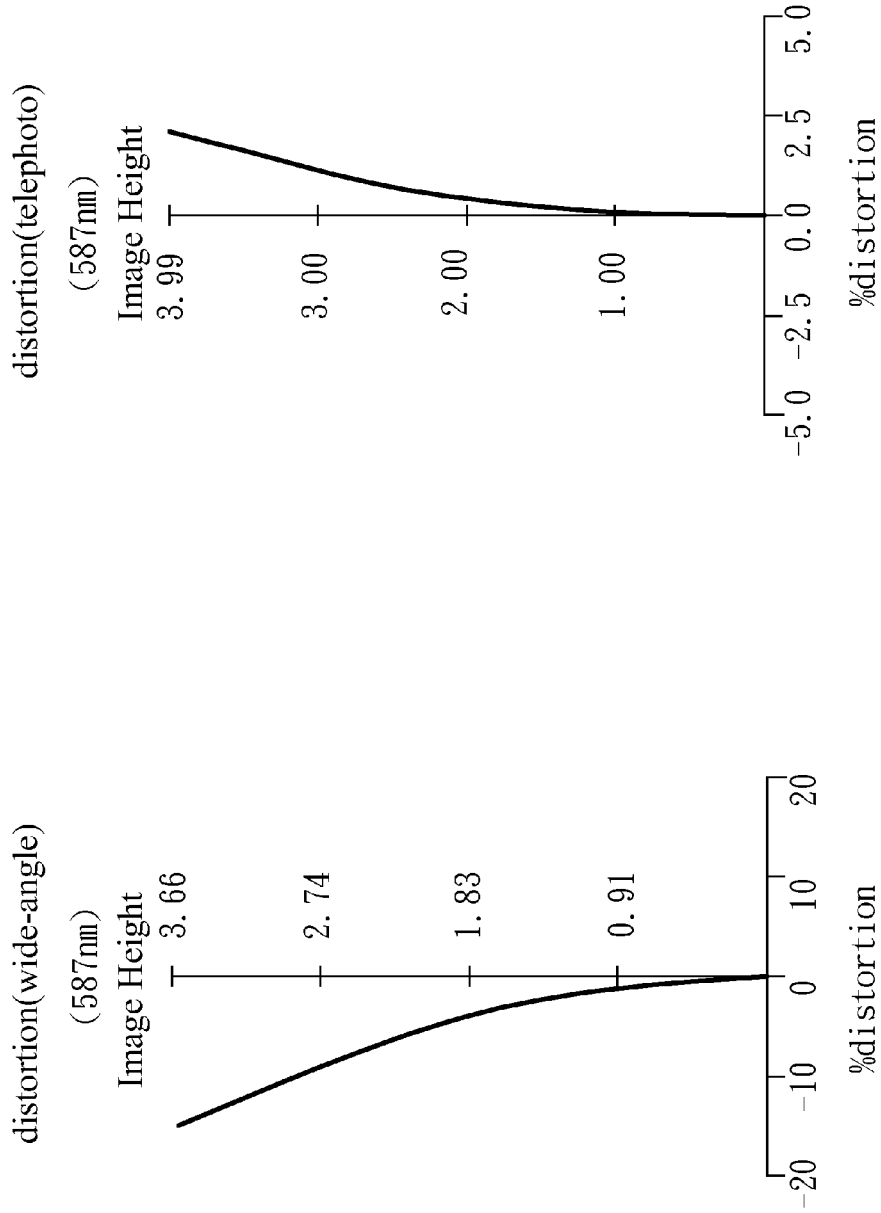
FIGS. 4A and 4B respectively show the distortion chart of the zoom lens at the wide-angle end and the telephoto end, according to an example of this invention.

FIGS. 4A and 4B respectively show the distortion chart of the zoom lens at the wide-angle end and the telephoto end, according to an example of this invention. As shown in the drawings, in the wide-angle end the distortion value for image beam with wavelength 587 nm is set in the range of (−15%, 0%) while (0%, 2.5%) in the telephoto end.

The results from FIGS. 2A-4B show that the spherical aberration, astigmatism, and distortion of the zoom lens can be properly adjusted. Therefore, embodiments of the present invention provide zoom lenses having advantages of compact size, high zoom ratio, good image quality, and low cost.

Although specific embodiments have been illustrated and described, it will be appreciated by those skilled in the art that various modifications may be made without departing from the scope of the present invention, which is intended to be limited solely by the appended claims.

What is claimed is:

1. A zoom lens comprising, in order from an object side to an image-forming side:
   a first lens group having positive refractive power and comprising, in order from the object side to the image-forming side, a first lens, a reflector, a second lens and a third lens, wherein the first lens, the second lens and the third lens have respective refractive powers;
   a second lens group having negative refractive power and comprising a convex-concave lens that is convex toward the image-forming side;
   a third lens group having positive refractive power; and
   a fourth lens group having positive refractive power;
   wherein the zoom lens satisfies the following condition: 2.0<|fG1/fG2|<4.0, wherein fG1 is a focal length of the first lens group, and fG2 is a focal length of the second lens group.

2. The zoom lens as recited in claim 1, wherein the zoom lens satisfies the following condition: 4.0<ft/fw<6.0, wherein fw is a focal length of the zoom lens at the wide-angle end, and ft is a focal length of the zoom lens at the telephoto end.

3. The zoom lens as recited in claim 1, wherein the second lens group and the fourth lens group are moved away from the third lens group, for zooming from the telephoto end to the wide-angle end.

4. The zoom lens as recited in claim 1, wherein the first lens group, the second lens group, the third lens group, and the fourth lens group respectively comprise at least one aspheric lens or free-form lens.

5. The zoom lens as recited in claim 1, wherein the first lens has negative refractive power, the second lens has positive refractive power and the third lens has positive refractive power.

6. The zoom lens as recited in claim 1, wherein the reflector is a prism, and the zoom lens satisfies the following condition: 1.5<PL/fw<2.2, wherein PL is an optical path length of incident image beams within the prism, and fw is a focal length of the zoom lens at the wide-angle end.

7. The zoom lens as recited in claim 1, wherein the third lens is an aspheric lens or a free-form lens.

8. The zoom lens as recited in claim 1, wherein the second lens group comprises, in order from the object side to the image-forming side, a first lens having negative refractive power, a second lens having negative refractive power, and a third lens having positive refractive power.

9. The zoom lens as recited in claim 8, wherein first lens is an aspheric lens or a free-form lens.

10. The zoom lens as recited in claim 8, wherein the first lens is a plastic lens, and the second lens and the third lens are glued to be a doublet lens.

11. The zoom lens as recited in claim 1, wherein the third lens group comprises a first lens having positive refractive power.

12. The zoom lens as recited in claim 11, wherein the first lens is an aspheric lens or a free-form lens.

13. The zoom lens as recited in claim 1, wherein the fourth lens group comprises, in order from the object side to the image-forming side, a first lens having positive refractive power, a second lens having positive refractive power, a third lens having negative refractive power, and a fourth lens having negative refractive power.

14. The zoom lens as recited in claim 13, wherein the second lens and the third lens are glued to be a doublet lens, and the fourth lens is a plastic lens, an aspheric lens or a free-form lens.

15. The zoom lens as recited in claim 1, further comprising a stop disposed between the second lens group and the third lens group.

16. The zoom lens as recited in claim 1, further comprising a filter disposed between the fourth lens group and an image-forming surface of the zoom lens.

17. An electronic device comprising the zoom lens claimed in claim 1.

18. The zoom lens as recited in claim 1, wherein the reflector is a prism, and the zoom lens satisfies the following condition: 1.5<P/fw<2.0, wherein P is a thickness of the prism, and fw is a focal length of the zoom lens at the wide-angle end.

19. A zoom lens comprising, in order from an object side to an image-forming side:
  a first lens group having positive refractive power and comprising, in order from the object side to the image-forming side, a first lens, a reflector, a second lens and a third lens, wherein the first lens, the second lens and the third lens have respective refractive powers;
  a second lens group having negative refractive power and comprising a convex-concave lens that is convex toward the image-forming side;
  a third lens group having positive refractive power; and
  a fourth lens group having positive refractive power;
  wherein the zoom lens satisfies the following condition: 4.0<ft/fw<6.0, wherein fw is a focal length of the zoom lens at the wide-angle end, and ft is a focal length of the zoom lens at the telephoto end.

20. The zoom lens as recited in claim 19, wherein the reflector is a prism, and the zoom lens satisfies the following condition: 1.5<P/fw<2.0, wherein P is a thickness of the prism, and fw is a focal length of the zoom lens at the wide-angle end.

21. A zoom lens comprising, in order from an object side to an image-forming side:
  a first lens group having positive refractive power and comprising, in order from the object side to the image-forming side, a first lens, a prism, a second lens and a third lens, wherein the first lens, the second lens and the third lens have respective refractive powers;
  a second lens group having negative refractive power and comprising a convex-concave lens that is convex toward the image-forming side;
  a third lens group having positive refractive power; and
  a fourth lens group having positive refractive power;
  wherein the zoom lens satisfies the following condition: 2.0<|fG1/fG2|<4.0 and 1.5<PL/fw<2.2, wherein fG1 is a focal length of the first lens group, fG2 is a focal length of the second lens group, PL is an optical path length of incident image beams within the prism, and fw is a focal length of the zoom lens at the wide-angle end.

* * * * *